United States Patent Office 2,753,382
Patented July 3, 1956

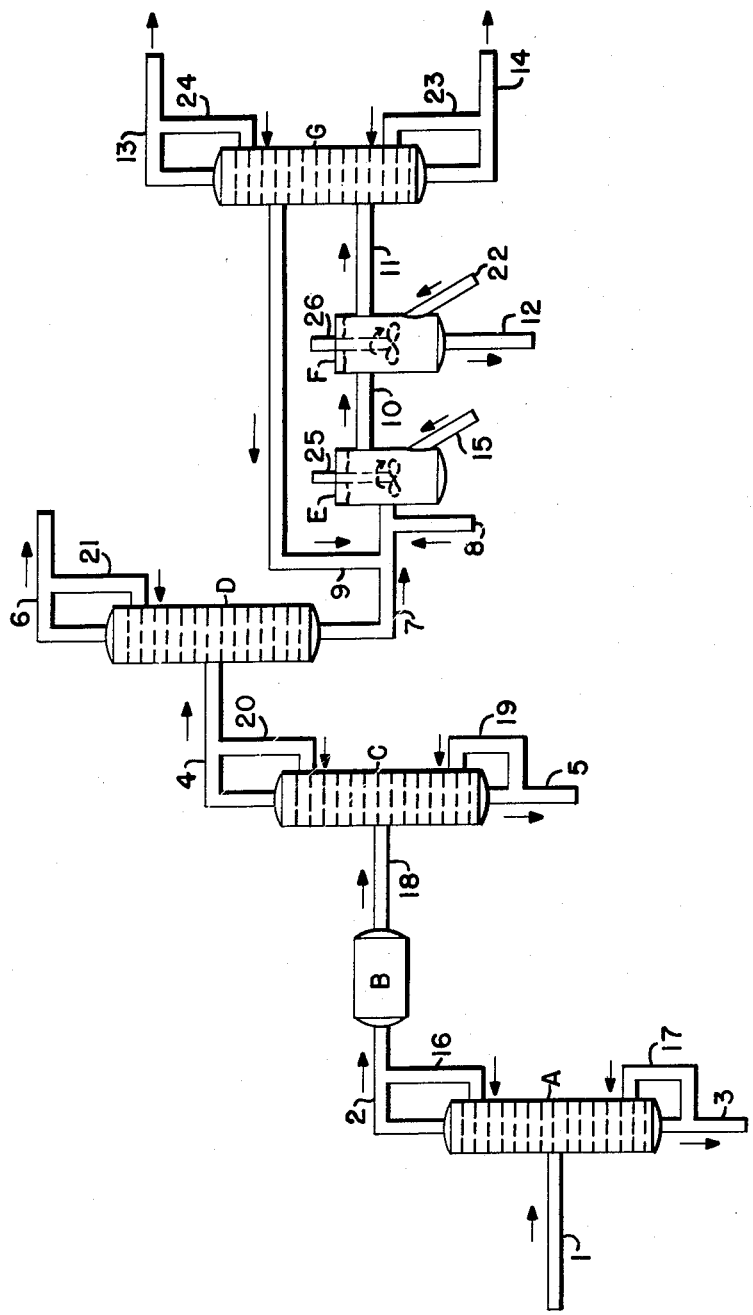

2,753,382

POLYMERS FROM PIPERYLENE CONCENTRATES

Glen P. Hamner, Baton Rouge, La., assignor to Esso Research and Engineering Company, a corporation of Delaware Application December 1, 1952, Serial No. 323,442

4 Claims. (Cl. 260—666)

This invention is concerned with the preparation of polymer oils from piperylene containing fractions boiling between 100–150° F. obtained as selected distillate cuts from steam cracked petroleum streams.

In general, heavier petroleum fractions such as naphtha, gas oil, and the like, are cracked at relatively low pressure and at temperatures of 1000 to 1500° F. in the presence of steam and for relatively short contact times. The gas and liquid streams produced contain large quantities of diolefins and olefins in the $C_5$ to $C_{10}$ range.

A naphtha produced by steam cracking contains large amounts of diolefins, olefins, aromatics, and some paraffins. The $C_5$ fraction (64–115° F.) from such a naphtha contains 15–20 wt. percent isoprene, 10–15 wt. percent cyclopentadiene, 10–15 wt. percent piperylene, 5 wt. percent other diolefins, 15–20 wt. percent tertiary olefins, 20–25 wt. percent normal olefins, and 2–5 wt. percent paraffins.

By using an initial, mild thermal soaking of the $C_5$ fraction containing olefins, diolefins, cyclic diolefins and aromatics at a temperature of 100–250° F. and sufficient treating time, the cyclopentadienes are dimerized and are removed as the dimers from the bottom of a distillation tower. This tower is operated to prevent any substantial depolymerization of the cyclodienes. The overhead, consisting of the undimerized portion, contains chiefly olefins and diolefins and aromatics, including the isoprene. Isoprene is recovered from the 60–100° F. fraction by extractive distillation. The remaining $C_5$ fraction (100–115° F.) from isoprene extraction feed preparation contains 40–50 wt. percent cis and trans piperylene, cyclopentane, 1-methyl-1-cyclo-butene, trimethylethylene, 1-2 pentadiene, 2-methyl-1-2-butadiene, and small amount of a $C_6$ olefin (t-butylethylene).

A polymerization of the reactive components in this stream is carried out in the presence of boron fluoride as a polymerization catalyst. This comprises a method for preparing polymerized oils of good quality. Under controlled conditions, good polymerization activity of the reactive aliphatic olefins and diolefins is obtained.

The above piperylene polymer oils can be used as drying oils or they can be copolymerized with other resins for paint or varnish manufacture or formulated in printing ink. The polymers have good color and odor. The piperylene polymers may be modified by the addition of other materials to the feed before polymerization with $BF_3$.

Using $BF_3$ as the polymerization catalyst, temperatures in the range of $-20°$ F. to $+40°$ F. are preferred. An inert diluent, such as a hydrocarbon naphtha or hexane or heptane may be used if desired.

The polymerization reaction is carried out as a liquid phase operation. The catalyst may be added continually or batchwise. Any practical and effective methods for adding catalyst and reagents can be utilized. When the catalyst used is gaseous boron fluoride, the liquid material undergoing reaction must be well agitated to insure adequate saturation of the liquid with the gas.

EXAMPLE 1

A selected steam cracked distillate stream was subjected to a thermal treatment to dimerize the cyclodienes. These cyclodiene dimers were then removed by careful fractionation as a bottoms stream. The lighter portions were obtained as an overhead stream. This overhead stream was substantially freed of isoprene by selective fractionation and extraction of this component. The bottoms fraction recovered from the fractionation step was useful as feed for this process. It contains from 40 to 50 wt. percent of cis and trans piperylene. A typical analysis of the 100–115° F. fraction thus obtained is as follows:

| Component | Analysis 1 | Analysis 2 |
|---|---|---|
| Isoprene, wt., percent | 1.1 | 1.5 |
| t-penetene-2, wt., percent | 3.6 | |
| c-pentene-2, wt., percent | 7.4 | 22.7 |
| 2 Methyl butene-2, wt., percent | 13.7 | |
| Cyclopentadiene, wt., percent | (approx.)1.2 | 1.2 |
| t-piperylene, wt., percent | 34.2 | 52.5 |
| c-piperylene, wt., percent | 20.9 | |
| Cyclopentene, wt., percent | 14.7 | 19.4 |
| Cyclopentane, wt., percent | 1.5 | |
| Acetylene as pentyne-1, wt., percent | 0.7 | |
| $C_6+$, wt., percent | 1.0 | 2.4 |
| Refractive Index, $n_D^{20}$ | | 1.4183 |
| Specific Gravity, 20/4° C | | 0.6926 |
| Conjugated Dienes by maleic anhydride, wt., percent | | 45.1 |

The above fraction (100–115° F. boiling range) containing piperylene was polymerized with $BF_3$ gas with a yield of approximately 90 wt. percent polymer. The polymerization was carried out at 30 to 40° F. Results of this reaction are shown in Table I.

Table I

Polymer properties:
    Iodine number cg./g _____ 243
    Color:
        Gardner _____ 10
        Gardner, diluted [1] _____ 1
    Gravity, API @ 60° F _____ 21.3
    Viscosity, SSU @ 210° F _____ 517
    NVM:
        3 hrs _____ 92.5
        24 hrs _____ 88.3

[1] 1 gm. polymer/67 mls. xylene.

EXAMPLE 2

A similar fraction as used in Example 1 above (100–115° F.) containing piperlyene was polymerized with $BF_3$ gas with a yield of 75.4 wt. percent polymer. The feed was first diluted in a ¼ ratio with a virgin naphtha as diluent and treated at 100–135° F. for 15 minutes residence time before addition of alcohol and water to destroy the catalyst. The unreacted portion and the virgin naphtha was removed by distillation. Results of this reaction are shown in Table II.

Table II

Polymer properties:
    Iodine number (ASTM) _____ 302
    Color:
        Gardner _____ 9
        Gardner, dil.[1] _____ <1
    Viscosity, SSU @ 210° F _____ 65
    Gravity, API @ 60° F _____ 26.7
    NVM, wt. percent:
        3 hrs _____ 82.8
        24 hrs _____ 77.5

[1] 1 gm. polymer/67 mls. xylene.

EXAMPLE 3

Polymer oils prepared from a piperylene concentrate stream, as described in Example 1, were tested as raw materials in varnish compositions. The liquid resin was cooked with vegetable drying oils including both linseed oil and tung oil. The tung oil formulation appears to be somewhat better. The liquid resin was readily incorporated into the varnish. The resulting varnishes were satisfactory as to color, viscosity, and air drying rate. The baked films containing the polymer were especially good. Results of the testing of the varnishes are shown in Tables III and IV.

The varnishes contained 0.4% lead and 0.04% manganese drier based on the polymer. The oil length value is expressed in terms of gallons of oil per hundred pounds of resin.

Table III

| Varnish No. | Oil | Oil Length | Cooking | | | Gardner Values | | Drying Rate (Hrs.)[1] | | | | | |
|---|---|---|---|---|---|---|---|---|---|---|---|---|---|
| | | | Temp., °F. | Time, Hrs. | Percent Loss | Color | Viscosity (poise) | 1 | 2 | 4 | 6 | 24 | 48 |
| 1 | Linseed | 15 | 560 | 6 | 31.7 | 13 | 2.0 | 8 | 8 | 7 | 5 | 0 | 0 |
| 2 | Tung | 15 | 450 | 2 | 13.0 | 9 | 0.5 | 8 | 7 | 5 | 3. | 2 | 1 |

[1] Drying rate code: 9—wet; 7—film just clings to finger; 6—set to touch; 3—decided tack but dust free; 0—tack free.

Table IV

AIR DRIED 1 WEEK EVALUATION [1]

| Varnish No. | Mils Thick | Hardness | Water | Soap | Grease | Caustic | Flex |
|---|---|---|---|---|---|---|---|
| 1 | 0.5 | 7 | 5 | 9 | 5 | 9 | 0 |
| 2 | 0.4 | 17 | 6 | 9 | 7 | 9 | 0 |

BAKED 30' @ 300° F. EVALUATION [1]

| 1 | 0.8 | [2] 4 | 0 | 0 | 2 | 4 | 0 |
| 2 | 0.7 | 14 | 0 | 0 | 0 | 0 | 0 |

[1] Evaluation code: Hard (Sward) in percent based on plate glass as 100.
Chemical resistance: 0—unaffected; 1-3—whitened or discolored and less adhesion; 4-6—softened and loss in adhesion; 7-9—pinholed or blistered to failure by removal of the film.
Flexibility (180° bend test): 0—unaffected; 1-4—hazed and less adhesion; 5-6—fine cracking; 7-9—heavy cracking and peeling.
[2] The low hardness exhibited in this test is a reflection of the high loss of resin during cooking.

EXAMPLE 4

Similar comparative tests were conducted by the preparation of varnishes from a solid hydrocarbon resin having a 76° C. melting point. This resin had been prepared by polymerizing a piperylene containing cut boiling up to 60° C. using $AlCl_3$ as the polymerizing catalyst. This resin was not readily soluble in the conjugated oils (tung and oiticica) and gave the general appearance of very poor incompatibility with them.

It is thus seen that $AlCl_3$ polymerized resins are not as satisfactory as varnish constituents as are the polymer oils prepared by $BF_3$ catalyst, when these piperylene containing fractions are employed as the polymerization feed streams.

EXAMPLE 5

The invention will be understood in greater detail by the following explanation which is to be read in conjunction with the accompanying schematic figure.

A debutanized steam cracked distillate containing $C_5$, $C_6$, and $C_7$ components is fed as stream 1 to tower A, having 30 plates and operated with 200° F. top temperature and 350° F. bottoms temperature at 45–50 lbs. pressure. Stream 2 is a concentrated $C_5$ fraction (final boiling point 145° F.) taken as an overhead stream and fed to a thermal soaking drum B. Part of stream 2 is returned as liquid reflux by line 16 to tower A. The depentanized naphtha is removed from tower A as stream 3, with part returned by line 17 to the tower to supply heat required during the distillation. Stream 2 is thermally soaked in drum B for 6–16 hours at <220° F. to dimerize the cyclopentadiene. The thermal soaked stream 18 is fed to tower C having 20 plates and operated with a 115° F. and 240° F. top and bottoms temperature respectively and at 15 pounds pressure. The overhead stream 4 contains isoprene and piperylene and $C_5$ olefins. Stream 20 returns reflux to tower C. Stream 5 is bottoms stream from tower C where the cyclopentadiene dimer is removed from the other $C_5$ components. A part is returned to the tower by line 19. Stream 4 is fed to tower D having 50 plates and operated at 100° F. and 114° F. top and bottoms temperature, respectively, and at 15–20 pounds pressure. Stream 6 containing the isoprene (final boiling point 100° F.) and low boiling $C_5$ olefins is taken as an overhead stream to be fed to a diolefin extraction unit for isoprene recovery, if desired. Stream 21 is a reflux stream to the tower. Stream 7 containing the piperylene (100–115° F.) and heavier boiling olefins is removed as a bottoms stream to be polymerized with a Friedel-Crafts type catalyst such as $BF_3$ in reactor E. An inert diluent is introduced through line 8 with the piperylene concentrate fed to reactor E. The reactor is operated at <150° F., preferably 0–50° F. or lower. Agitation is provided by stirrer 25. The catalyst is introduced continuously through line 15. The catalyst may be $BF_3$ gas or its complexes. The polymerized feed and solvent stream 10 is fed to vessel F for water or steam washing. Agitation is provided by stirrer 26. The catalyst is removed with the water through line 12. The solvent and polymerized material is then fed to tower G by line 11. Tower G has 30 plates and is operated with 120° F. top and 400° F. bottom temperature. Stream 9 is side stream or recycle solvent. Stream 13 contains the unreacted $C_5$ fraction, mostly trimethylethylene and cyclopentene. Reflux to the tower is provided by line 24. The piperylene polymer is removed from the bottom of tower G through line 14. Heat is supplied to the column by return line 23. To improve the polymer color, stream 11 may be charcoal treated prior to distillation to remove small amounts of color present.

What is claimed is:

1. A process for the preparation of polymer products which comprises subjecting a steam cracked petroleum fraction boiling between 100° and 115° F. and consisting of 40 weight percent up to 50 weight percent piperylene and 50 to 60% of a mixture of cyclopentanes, 1-methylcyclobutene, tri-methyleneethylene, 1,2-pentadiene, 2-methyl-1-2-butadiene, and tertiary butyl ethylene to polymerization in the presence of $BF_3$ at a temperature in the range of —20° F. to +40° F.

2. A process for the preparation of unsaturated polymer oils which comprises treating a steam cracked petroleum stream boiling between 100° and 115° F. and consisting of 40 to 50 weight percent of piperylene and 50 to 60% of a mixture of cyclopentanes, 1-methyl-cyclobutene, tri-methyleneethylene, 1,2-pentadiene, 2-methyl-1-2-butadiene and tertiary butyl ethylene with $BF_3$ at a temperature below 0° F.

3. An unsaturated drying oil prepared by the polymerization of a steam cracked petroleum fraction boiling from 100° to 115° F. and consisting of 40% to 50% piperylene and 50 to 60% of a mixture of cyclopentanes, 1-methyl-cyclobutene, tri-methylethylene, 1,2-pentadiene, 2-methyl-1-2-butadiene and tertiary butyl ethylene in the presence of $BF_3$ as a polymerization catalyst.

4. A process for the preparation of polymer products which comprises subjecting a steam cracked fraction boiling at 64 to 115° F. and containing 15 to 20 weight percent of isoprene, 10 to 15 weight percent of cyclopentadiene, 10 to 15 weight percent of piperylene, 5 weight percent of other diolefins, 15 to 20 weight percent tertiary olefins, 20 to 25 weight percent normal olefins and 2 to 5% normal paraffins to a thermal soaking at a temperature of 100–250° F. until the cyclopentadienes are dimerized, distilling the dimerized fraction to remove the dicyclopentadienes, distilling the dicyclopentadiene-free fraction to remove isoprene and subjecting the remaining fraction to polymerization in the presence of boron fluoride catalyst at a temperature between —20 and +40° F.

References Cited in the file of this patent
UNITED STATES PATENTS

| | | |
|---|---|---|
| 2,092,889 | Mikeska et al. | Sept. 14, 1937 |
| 2,131,195 | Schneider et al. | Sept. 27, 1938 |
| 2,151,382 | Harmon | Mar. 21, 1939 |
| 2,252,333 | Rothrock | Aug. 12, 1941 |
| 2,704,778 | Maisel | Mar. 22, 1955 |